(12) United States Patent
Thor

(10) Patent No.: US 8,543,284 B2
(45) Date of Patent: Sep. 24, 2013

(54) VEHICLE SPEED SENSOR DIAGNOSTIC SYSTEM AND METHOD

(75) Inventor: Todd J. Thor, Byron, MI (US)

(73) Assignee: GM Global Technology Operations LLC

( * ) Notice: Subject to any disclaimer, the term of this patent is extended or adjusted under 35 U.S.C. 154(b) by 1303 days.

(21) Appl. No.: 11/468,021

(22) Filed: Aug. 29, 2006

(65) Prior Publication Data

US 2008/0059017 A1    Mar. 6, 2008

(51) Int. Cl.
*G01M 17/00* (2006.01)

(52) U.S. Cl.
USPC ....................................... 701/29.7

(58) Field of Classification Search
USPC ............... 701/58, 62, 63, 29.1, 29.7, 30.3, 701/30.5, 30.7, 30.8, 31.1; 303/122.05
See application file for complete search history.

(56) References Cited

U.S. PATENT DOCUMENTS

| | | | | |
|---|---|---|---|---|
| 4,779,490 A * | 10/1988 | Milunas et al. | ............... | 477/115 |
| 4,849,899 A * | 7/1989 | Cote et al. | ........................ | 701/63 |
| 4,853,673 A * | 8/1989 | Kido et al. | ..................... | 340/439 |
| 4,881,428 A * | 11/1989 | Ishikawa et al. | .............. | 477/110 |
| 4,922,425 A * | 5/1990 | Mack et al. | ...................... | 701/63 |
| 4,958,287 A * | 9/1990 | Sugimura et al. | ............... | 701/62 |
| 4,964,318 A * | 10/1990 | Ganoung | ...................... | 477/110 |
| 5,033,328 A * | 7/1991 | Shimanaka | .................... | 477/109 |
| 5,142,945 A * | 9/1992 | Shimanaka | .................... | 477/154 |
| 5,157,607 A * | 10/1992 | Stainton et al. | .................. | 701/62 |
| 5,393,278 A * | 2/1995 | Kyushima et al. | ............. | 477/120 |
| 5,401,223 A * | 3/1995 | White et al. | ................... | 477/108 |
| 5,415,605 A * | 5/1995 | Yoshimura et al. | ............ | 477/121 |
| 5,553,451 A * | 9/1996 | Harada | ............................ | 60/277 |
| 5,681,240 A * | 10/1997 | Sunada et al. | ................. | 477/125 |
| 5,685,799 A * | 11/1997 | Vukovich et al. | ............... | 477/61 |
| 5,876,301 A * | 3/1999 | Tabata et al. | ................... | 477/109 |
| RE36,186 E * | 4/1999 | White et al. | ................... | 477/108 |
| 6,175,797 B1 * | 1/2001 | Iizuka | .............................. | 701/51 |
| 6,309,324 B1 * | 10/2001 | Sawa et al. | ..................... | 477/125 |
| 6,371,888 B1 * | 4/2002 | Watanabe | ....................... | 477/174 |
| 6,459,979 B2 * | 10/2002 | Murakami | ....................... | 701/54 |
| 6,679,133 B1 * | 1/2004 | Kayano et al. | .................. | 74/335 |
| 6,969,341 B2 * | 11/2005 | Hase et al. | ...................... | 477/110 |
| 7,047,124 B2 * | 5/2006 | Eriksson et al. | .............. | 701/110 |
| 7,072,748 B2 * | 7/2006 | Kwon | .......................... | 701/29.2 |
| 7,211,027 B2 * | 5/2007 | Sakamoto et al. | ............. | 477/107 |
| 7,214,163 B2 * | 5/2007 | Jeon | ................................ | 477/109 |
| 7,544,140 B2 * | 6/2009 | Tabata et al. | ....................... | 475/5 |
| 8,170,741 B2 * | 5/2012 | Noguchi | ........................ | 701/29.1 |
| 2006/0289210 A1 * | 12/2006 | Yoshimi | ......................... | 180/65.2 |

* cited by examiner

*Primary Examiner* — Thomas Black
*Assistant Examiner* — Sze-Hon Kong

(57) ABSTRACT

A diagnostic system for a vehicle speed sensor is provided. The system includes: an upshift module that selectively initiates an upshift of a transmission based on a vehicle speed sensor (VSS) signal; a speed drop detection module that monitors at least one of engine speed and input speed for a reduction in speed due to said upshift; and a torque request module that monitors engine torque and selectively diagnoses a VSS malfunction based on said speed reduction and said engine torque.

11 Claims, 3 Drawing Sheets

VEHICLE SPEED SENSOR DIAGNOSTIC SYSTEM AND METHOD

FIELD

The present disclosure relates to vehicle diagnostic systems and more particularly to vehicle diagnostic systems and methods that determine a malfunction of a speed sensor.

BACKGROUND

A vehicle powertrain typically includes a transmission and an engine. The transmission transfers engine torque to a driveshaft, which rotates the wheels of the vehicle. A vehicle speed sensor determines the rotational speed of the driveshaft. One particular type of vehicle speed sensor is a Hall-effect sensor that determines the driveshaft speed based on an induced current generated by changing magnetic fields. The Hall-effect sensor does not require an external power source. However, the Hall-effect sensor fails to determine low rotational speeds accurately.

A power operated vehicle speed sensor (VSS) allows for increased accuracy in determining low rotational speeds. This type of sensor may fail when power is interrupted to the sensor. However, when the VSS is not responding, it may be difficult to determine whether power is interrupted to the VSS or the output shaft is actually motionless.

SUMMARY

Accordingly, a diagnostic system for a vehicle speed sensor is provided. The system includes; an upshift module that selectively initiates an upshift of a transmission based on a vehicle speed sensor (VSS) signal; a speed drop detection module that monitors at least one of engine speed and input speed for a reduction in speed due to said upshift; and a torque request module that monitors engine torque and selectively diagnoses a VSS malfunction based on said speed reduction and said engine torque.

In other features, a method of diagnosing a malfunction of a VSS is provided. The method includes: selectively initiating an upshift of a transmission based on a vehicle speed sensor (VSS) signal, monitoring at least one of engine speed and input speed for a reduction in speed due to said upshift; monitoring engine torque when a reduction in speed occurs; and selectively diagnosing a VSS malfunction based on said reduction in speed and said engine torque.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
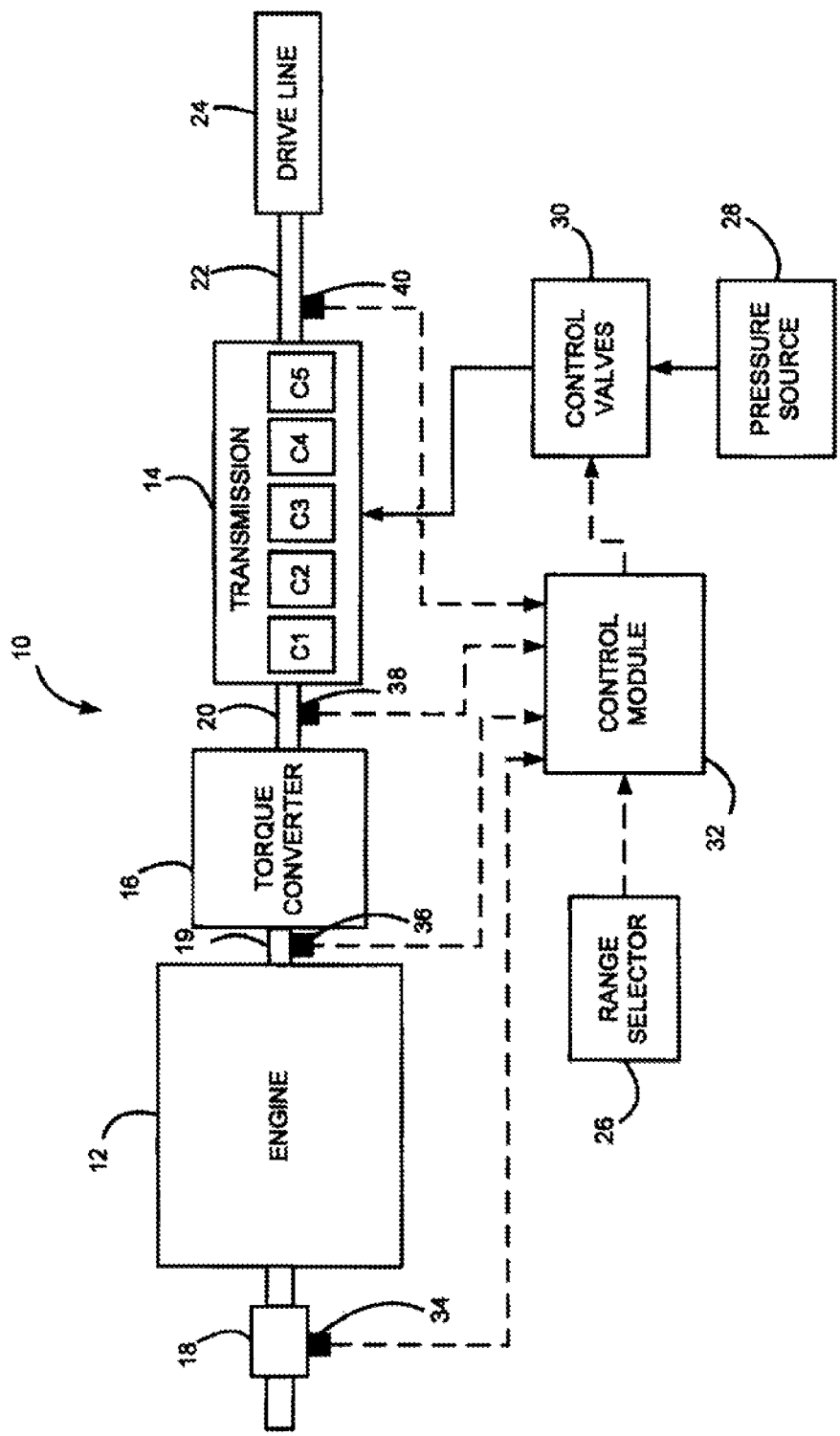
FIG. 1 is a functional block diagram of a vehicle including a power operated vehicle speed sensor diagnostic system according to the present disclosure.

The following description is merely exemplary in nature and is in no way intended to limit the disclosure, its application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, a vehicle is shown generally at 10. The vehicle includes an engine 12 that drives a transmission 14 through a torque converter 16. Air is drawn into the engine 12 through a throttle 18. The air is mixed with fuel and combusted within cylinders (not shown) of the engine 12 to rotatably drive a crankshaft 19 to produce drive torque. The torque converter 16 supplies the drive torque to the transmission 14 via an input shaft 20. The transmission 14 in the exemplary embodiment is a multi-speed, automatic, clutch-to-clutch transmission that drives an output shaft 22 based on the drive torque. As can be appreciated, the transmission 14 may be any type of automatic transmission.

The output shaft 22 drives a driveline 24 of the vehicle 10. A range selection device 26 enables an operator to set the transmission 14 at a desired operating range including, but not limited to, park, reverse, neutral, and one or more forward drive positions. The speed and torque relationships between the engine 12 and the driveline 24 are controlled by hydraulically operated clutches C1, C2, C3, C4, and C5 of the transmission 14. Pressurized fluid is provided to the clutches from a regulated hydraulic pressure source 28. The clutches C1, C2, C3, C4, and C5 are coupled to the hydraulic pressure source via control valves 30, which regulate clutch pressure by supplying or discharging fluid to/from the clutches C1, C2, C3, C4, and C5.

A control module 32 controls the valves 30 based on a desired drive ratio. The drive ratios correspond to one or more gears. More specifically the control module 32 controls the valves 30 to selectively engage and disengage the five clutches C1, C2, C3, C4 and C5 in order to provide neutral, six forward drive ratios, and one reverse drive ratio. Although the exemplary automatic transmission 14 includes six forward drive ratios and one reverse drive ratio, it is appreciated that the automatic transmission 14 can operate in more or fewer drive ratios.

The control module 32 controls the transmission 14 based on various inputs received from various sensors and/or other control modules (not shown) within the vehicle 10. A throttle position sensor 34 is responsive to the position of the throttle 18 and outputs a throttle position signal. An engine speed sensor 36 is responsive to a rotational speed of the crankshaft 19 and outputs an engine speed signal. An input speed sensor 38 is responsive to a rotational speed of the input shaft 20 and generates an input speed signal. An output speed sensor 40 is responsive to the rotational speed of the output shaft 22 and outputs an output speed signal. The control module 32 receives the above mentioned signals and diagnoses at least one of the output speed sensor 40 and the input speed sensor 38 based on a speed sensor diagnostic method of the present disclosure. For ease of the discussion, the remainder of the disclosure will refer to the input speed sensor 38 and the output speed sensor 40 commonly as the vehicle speed sensor (VSS).

Figure 2:
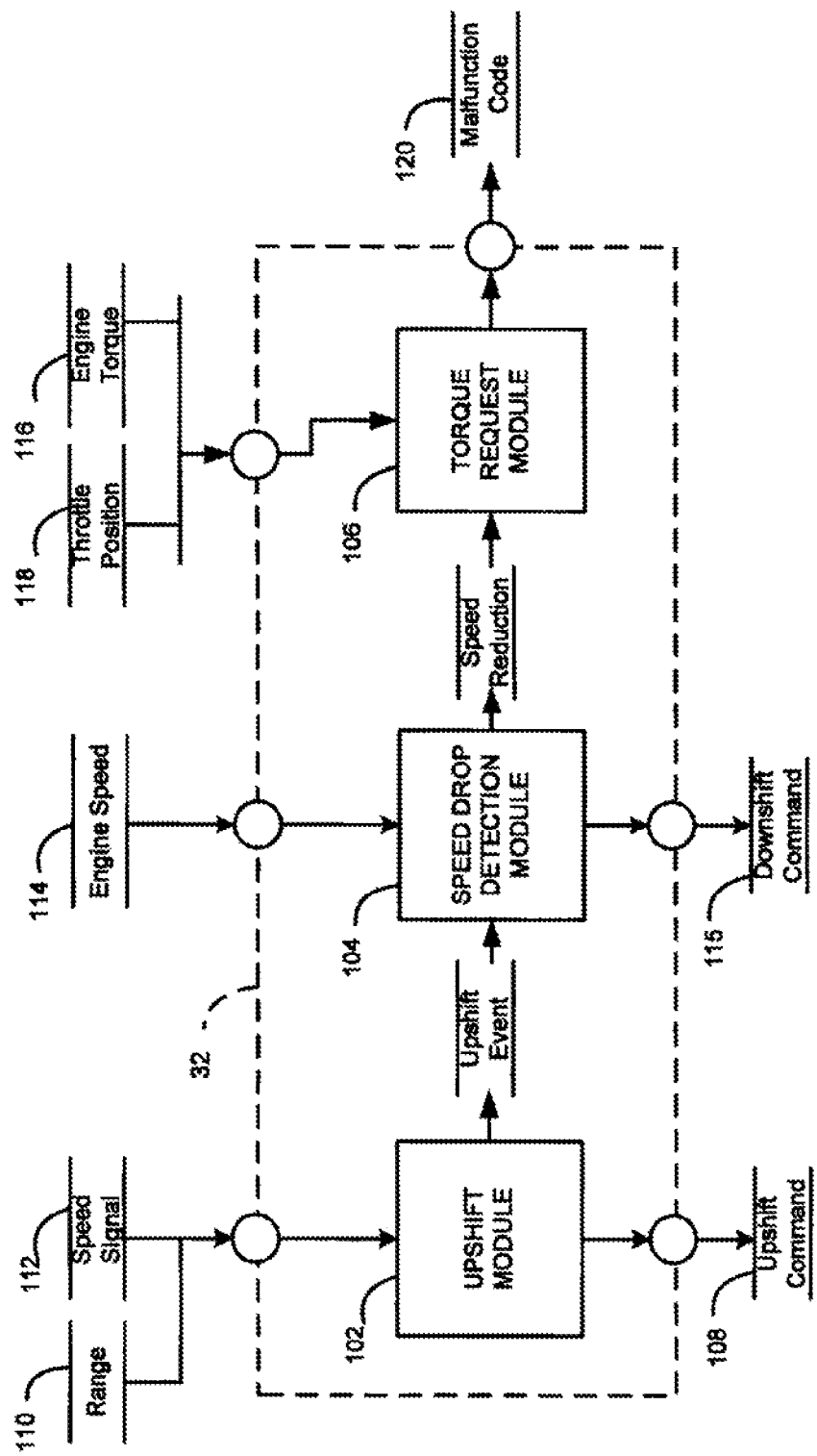
FIG. 2 is a data flow diagram illustrating a vehicle speed sensor diagnostic system according to the present disclosure.

Referring now to FIG. 2, a dataflow diagram illustrates various embodiments of a vehicle speed sensor diagnostic system that may be embedded within the control module 32. Various embodiments of vehicle speed sensor diagnostic systems according to the present disclosure may include any number of sub-modules embedded within the control module 32. The sub-modules shown may be combined and/or further partitioned to similarly diagnose malfunctions of vehicle speed sensors. The inputs of the system 32 can be received from sensors within the vehicle 10, determined by other sub-modules within the control module 32, or received from other control modules (not shown) within the vehicle 10.

In various embodiments, the control module 32 of FIG. 2 includes an upshift module 102, a speed drop detection module 104, and a torque request module 106. The upshift module 102 selectively initiates an upshift command 108 thus controlling the transmission 16 (FIG. 1) to shift to a higher gear ratio. The upshift module 102 commands the upshift event when the transmission 16 is operating in a drive range 110 and the vehicle speed 112, determined from the VSS signal, is below a predetermined threshold (e.g., zero or near zero).

The speed drop detection module 104 determines if the engine speed 114 is reduced during and/or after the upshift event. More specifically, the speed drop detection module 104 monitors the engine speed. A reduction in speed is determined when a first engine speed value is greater than a second engine speed value. Where, the first engine speed value can be defined as the engine speed immediately before the upshift event. The second engine speed value can be defined as the engine speed immediately after the upshift event. As can be appreciated, the speed drop detection module 104 can similarly determine a reduction in speed based on the input speed generated by the input speed sensor 20 (FIG. 1). If the engine speed does not drop after the upshift event, the speed drop detection module 104 initiates a downshift command 115 thus controlling the transmission 16 (FIG. 1) to shift to a lower gear ratio.

The torque request module 106 determines whether the speed reduction is due to the upshift event or a reduction in engine torque. More specifically, the torque request module 106 evaluates at least one of engine torque 116 or throttle position 118 which directly relates to engine torque. For example, a vehicle operator may lift their foot from an accelerator pedal during the upshift event thereby causing a negative change in the throttle position 118. The negative change in throttle position 118 causes a reduction in the engine torque 116. Therefore, the torque request module monitors the engine torque 116 and/or the throttle position 118. In various embodiments, the reduction in engine torque 116 is determined based on comparing engine torque 116 before the upshift event to engine torque 116 after the upshift event. Similarly, the reduction in engine torque 116 is determined based on comparing the throttle position 115 before the upshift event to the throttle position 118 after the upshift event.

If the reduction in engine speed 114 is due to a reduction in engine torque 115, the torque request module diagnoses the VSS as working properly. If the reduction in engine speed 114 is not due to a reduction in engine torque, but only due to the upshift event, the torque request module diagnoses the VSS as malfunctioning. A diagnostic code 120 is set accordingly.

Figure 3:
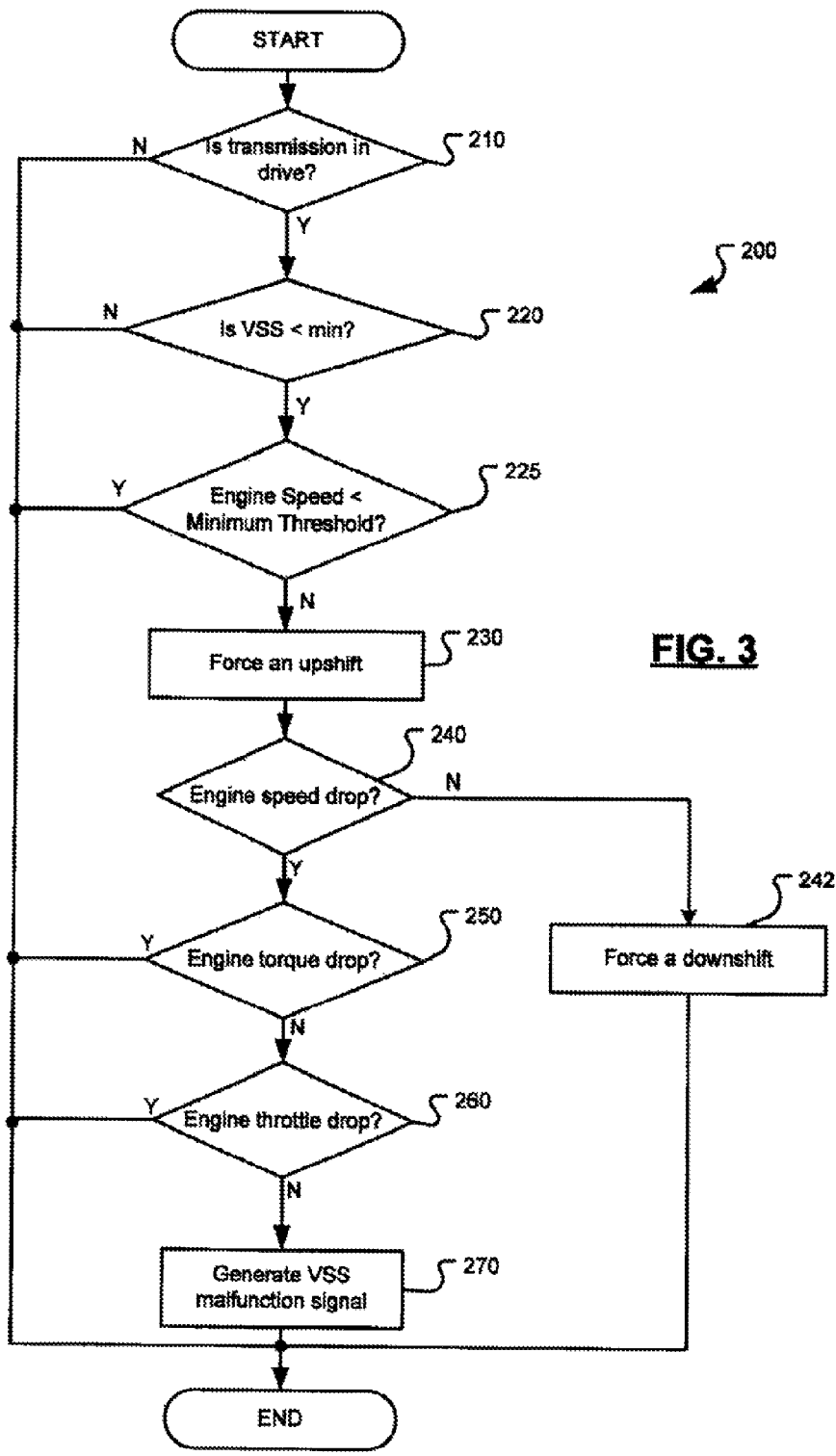
FIG. 3 is a flowchart illustrating a method of diagnosing a vehicle speed sensor according to the present disclosure.

Referring now to FIG. 3, exemplary steps of the speed sensor diagnostic system are generally identified at 200. In step 210, control evaluates the operating range of the transmission. If the transmission is operating in a drive range, control proceeds to step 220. Otherwise control terminates. If the VSS is not sending a speed signal or the signal is less than or equal to a predetermined minimum (e.g., zero) at 220, then control proceeds to step 225, otherwise control terminates. In step 225, control determines if the engine is operating in an idle mode by comparing engine speed to a predetermined minimum threshold. When the engine is not in idle mode (engine speed is greater than the minimum threshold), control proceeds to step 230. Otherwise control initiates a downshift event at 242 and terminates.

In step 230, control initiates an upshift event. In step 240, control evaluates the engine speed. If there is a reduction in engine speed at 240 control proceeds to step 250. Otherwise control terminates. It the engine speed drops, control proceeds to determine if the engine speed drop is due to a decrease in engine torque (i.e., release of the acceleration pedal). In step 250, control determines if an engine torque drop occurs. If the engine torque drops then control terminates. If the engine torque has not dropped, control proceeds to check whether the throttle position has changed (e.g., decreases by a predetermined amount) in step 260. If the throttle position drops, control terminates. If the throttle position does not change, there is no deceleration and the engine speed drop is caused by the upshift event. Therefore, control sets a malfunction code in step 270.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will come apparent to the skilled practitioner upon a study of the drawings, specification, and the following claims.

What is claimed is:

1. A diagnostic system for a vehicle speed sensor, the diagnostic system comprising:

an upshift module that i) receives a vehicle speed sensor (VSS) signal indicative of a vehicle speed and ii) initiates an upshift of a transmission in response to the vehicle speed being less than a predetermined vehicle speed threshold and an engine speed being greater than a predetermined engine speed threshold;

a speed drop detection module that determines when the engine speed decreases in response to the upshift; and a torque request module that diagnoses a VSS malfunction if:

a determination is made that the engine speed decreased in response to the upshift; and a determination is made after the upshift that engine torque did not decrease and a determination is made after the upshift that throttle position did not decrease.

2. The diagnostic system of claim 1 wherein the upshift module initiates the upshift further in response to a determination that the transmission is operating in a drive range.

3. The diagnostic system of claim 1 wherein the speed drop detection module determines that the engine speed decreases based on a difference between a first engine speed determined before initiating the upshift and a second engine speed determined after initiating the upshift.

4. The diagnostic system of claim 1 wherein the engine torque is determined based on engine operating parameters.

5. The diagnostic system of claim 1 wherein said torque request module diagnoses the VSS malfunction in response to a change in the throttle position being within a predetermined negative range and the engine speed being decreased.

6. The diagnostic system of claim 1 wherein the torque request module sets a diagnostic code based on the VSS malfunction.

7. A method of diagnosing a malfunction of a speed sensor, comprising:
  receiving a vehicle speed sensor (VSS) signal indicative of a vehicle speed;
  initiating an upshift of a transmission in response to the vehicle speed being less than a predetermined vehicle speed threshold and an engine speed being greater than a predetermined engine speed threshold;
  determining when the engine speed decreases in response to the upshift; and
  diagnosing a VSS malfunction if:
    a determination is made that the engine speed decreased in response to the upshift; and
    a determination is made after the upshift that engine torque did not decrease and a determination is made after the upshift that throttle position did not decrease.

8. The method of claim 7 wherein the initiating the upshift occurs in response to a determination that the transmission is operating in a drive range.

9. The method of claim 7 wherein the determining that the engine speed decreases further comprises determining a difference between a first engine speed determined before initiating the upshift and a second engine speed determined after initiating the upshift.

10. The method of claim 7 wherein the diagnosing the VSS malfunction further comprises diagnosing the VSS malfunction in response to a change in the throttle position being within a predetermined negative range and the engine speed being decreased.

11. The method of claim 7 further comprising setting a diagnostic code based on the VSS malfunction.

* * * * *